United States Patent
Baeumler (10) Patent No.: US 9,726,235 B2
(45) Date of Patent: Aug. 8, 2017

(54) FREEWHEEL AND FREEWHEEL ARRANGEMENT

(71) Applicant: BorgWarner Inc., Auburn Hills, MI (US)

(72) Inventor: Richard Baeumler, Brunnen (DE)

(73) Assignee: BorgWarner Inc., Auburn Hills, MI (US)

( * ) Notice: Subject to any disclaimer, the term of this patent is extended or adjusted under 35 U.S.C. 154(b) by 243 days.

(21) Appl. No.: 14/339,752

(22) Filed: Jul. 24, 2014

(65) Prior Publication Data

US 2015/0034442 A1    Feb. 5, 2015

(30) Foreign Application Priority Data

Aug. 1, 2013 (DE) .................. 10 2013 012 804

(51) Int. Cl.
  *F16D 41/064*  (2006.01)
  *F16D 41/066*  (2006.01)
  *F16D 41/06*   (2006.01)

(52) U.S. Cl.
  CPC ......... *F16D 41/064* (2013.01); *F16D 41/066* (2013.01); *F16D 2041/0605* (2013.01); *F16D 2041/0665* (2013.01)

(58) Field of Classification Search
  None
  See application file for complete search history.

(56) References Cited

U.S. PATENT DOCUMENTS

| 2,843,238 A  * | 7/1958 | Rozner ................. F16D 41/067 |
|                |        | 192/45.007 |
| 8,459,424 B2 * | 6/2013 | Altmann ............... F16D 41/067 |
|                |        | 192/45.016 |
| 2005/0034951 A1* | 2/2005 | Takasu .................. F16D 41/064 |
|                |        | 192/45.016 |

FOREIGN PATENT DOCUMENTS

| DE | 10 2008049 799 | * | 4/2010 |
| WO | WO 2009/110105 | * | 9/2009 |

* cited by examiner

*Primary Examiner* — Colby M Hansen
(74) *Attorney, Agent, or Firm* — BrooksGroup (57) ABSTRACT

The present invention relates to a freewheel (4) having an inner ring (38), an outer ring (40) and at least one wedging element (48) between the inner ring (38) and the outer ring (40), which can be moved from a wedging position, in which the wedging element (48) prevents rotation of the outer ring (40) relative to the inner ring (38) in a first circumferential direction (24), into a release position, in which the outer ring (40) can be rotated in an opposite, second circumferential direction (26) relative to the inner ring (38), wherein the wedging element (48) is preloaded into the wedging position by means of a spring element (64). The spring element (64) has an elongate spring body (66), which extends in a radial plane and has a corrugated profile in the radial direction (20, 22). The present invention furthermore relates to a freewheel arrangement (2) having a freewheel (4) of this kind.

18 Claims, 6 Drawing Sheets

FREEWHEEL AND FREEWHEEL ARRANGEMENT

CROSS-REFERENCE TO RELATED APPLICATIONS

This application claims the benefit of German Patent Application No. 10 2013 012804.8 filed Aug. 1, 2013.

The present invention relates to a freewheel having an inner ring, an outer ring and at least one wedging element between the inner ring and the outer ring, which can be moved from a wedging position, in which the wedging element prevents rotation of the outer ring relative to the inner ring in a first circumferential direction, into a release position, in which the outer ring can be rotated in an opposite, second circumferential direction relative to the inner ring, wherein the wedging element is preloaded into the wedging position by means of a spring element.

BACKGROUND

Freewheel arrangements used to couple a starter to an engine output shaft are known in practice. The known freewheel arrangements have a freewheel, wherein the freewheel has an inner ring, an outer ring and a plurality of wedging elements, in particular wedging rollers, between the inner ring and the outer ring. The wedging elements can each be moved from a wedging position, in which the wedging element prevents rotation of the outer ring relative to the inner ring in one circumferential direction, into a release position, in which the outer ring can be rotated in an opposite, second circumferential direction relative to the inner ring. In this case, the wedging elements are each preloaded into said wedging position by means of a spring element. In this case, helical springs are used as spring elements and are arranged together with the wedging elements within the wedging gap between the inner ring and the outer ring and are supported, on the one hand, on the associated wedging element and, on the other hand, on the outer or inner ring in order to bring about a preload of the wedging element into the wedging position in one circumferential direction. In order to allow integration of a freewheel of this kind into the drive train in a manner which saves installation space, freewheels have more recently been designed in such a way that they have a small axial overall length. This had the result of reducing the wedging gap between the inner ring and the outer ring in the axial direction and increasing it in the radial direction, the same applying in a corresponding manner to the wedging element within the wedging gap. In a corresponding way, it was also necessary to reduce the turn diameter of the helical springs used as a spring element. However, a helical spring made smaller in this way leads to the problem that reliable support for the wedging element on the helical spring, on the one hand, and reliable support for the helical spring on the inner ring or outer ring, on the other hand, is not assured without expensive measures for the reliable attachment and guidance of the helical spring at both ends. In other words, either reliable operation of the spring element designed as a helical spring is jeopardized or the production and assembly of the freewheel is associated with an increased outlay.

It is therefore an object of the present invention to provide a freewheel having at least one wedging element and a spring element associated with the wedging element to preload the wedging element into the wedging position thereof, which freewheel ensures reliable operation of the spring element and is associated with a low production and assembly outlay. The present invention is furthermore based on the object of providing a freewheel arrangement for a motor vehicle having a freewheel with such advantages.

The freewheel according to the invention has an inner ring, an outer ring and at least one wedging element between the inner ring and the outer ring. Here, the free space formed in the radial direction between the outer ring and the inner ring for accommodating the wedging element can also be referred to as the wedging gap. The wedging element can be a wedging roller, a wedging body or a locking blade, for example. Although the term wedging element or at least one wedging element is used herein in all cases, it is preferred if a plurality of wedging elements is arranged between the inner ring and the outer ring, these preferably being spaced apart uniformly from one another in the circumferential direction. The wedging element can be moved from a wedging position, in which the wedging element prevents rotation of the outer ring relative to the inner ring in one circumferential direction, into a release position, in which the outer ring can be rotated or turned in an opposite, second circumferential direction relative to the inner ring. The individual wedging element is preloaded into the abovementioned wedging position by means of a spring element. As with a helical spring, the spring element of the freewheel according to the invention also has an elongate spring body. However, the elongate spring body is not wound in a helical shape; on the contrary, the elongate spring body extends in a radial plane, i.e. in a plane defined by the radial directions of the freewheel, wherein the elongate spring body has a corrugated profile in the radial direction. Thus, the elongate spring body can have an undulating or zigzag profile in the radial direction, for example, wherein the elongate spring body extends in the radial plane in this arrangement. Since the elongate spring body extends in the radial plane, it is particularly suitable for use within a wedging gap which has a particularly small extent or width in relation to the axial direction. Thanks to the elongate spring body of the spring element extending in the radial plane, it is consequently possible to provide a freewheel with a particularly small axial overall length. Moreover, the corrugated profile in the radial direction of the elongate spring body means that the spring element can have a significantly greater extent in the radial direction than in the axial direction. Consequently, a spring element of this kind is suited for extension over a large part of the height or substantially over the entire height of the wedging gap in the radial direction and thus for filling the wedging gap to a great extent. This has the advantage that a wedging element designed to correspond to the wedging gap can be supported in a particularly reliable manner on the spring element without the need to take further measures in this regard, as is the case, for example, with a spring element designed as a helical spring, which has the same extent in the axial direction and in the radial direction and is consequently not suited to filling the height of a relatively narrow wedging gap. The attachment or support of the spring element to or on the outer or inner ring is thereby simplified.

In a preferred embodiment of the freewheel according to the invention, the spring body is formed by a sheet-metal part or wire. The sheet-metal part can be formed by a sheet-metal strip which has a corrugated profile in the radial direction, for example, wherein, in this case, the direction of the width of the sheet-metal strip preferably corresponds to the axial direction of the freewheel. The wire can have a circular cross section, for example, making it possible to resort to a standardized or simple wire in the manufacture of the spring element, which reduces the outlay on manufacture.

In an advantageous embodiment of the freewheel according to the invention, the corrugated profile of the spring body in the radial direction means that it has radially outer corrugation peaks and radially inner corrugation troughs, between which legs of the spring body extend, said legs preferably extending in a straight line. In this embodiment, it is furthermore preferred if at least two, if appropriate at least three, corrugation peaks and at least two, if appropriate at least three, corrugation troughs are provided.

In another preferred embodiment of the freewheel according to the invention, the spring body has a supporting leg on which the wedging element can be supported or is supported. The supporting leg is preferably designed as the last or end leg of the spring body corrugated in the radial direction. It is also preferred if the supporting leg extends over at least 50% of the height of the wedging element in the radial direction.

In order to achieve reliable support of the wedging element on the supporting leg of the spring body, the supporting leg in another advantageous embodiment of the freewheel according to the invention has a greater width in relation to the axial direction than another section, if appropriate than at least one of the legs, of the spring body. If the spring body legs extending between the corrugation peaks and corrugation troughs have a narrower width than the supporting legs in relation to the axial direction, not only is reliable support of the wedging elements on the supporting leg ensured but, what is more, what may be a desirable, lower spring stiffness or spring rate of the spring element can be ensured by the spring body legs which have a reduced width.

In order, on the one hand, to ensure reliable support of the wedging elements on the supporting leg and, on the other hand, to bring about uniform introduction of the preloading force of the spring element into the wedging element, the supporting leg has a profile which is matched to the outer contour of the wedging element. Thus, depending on the design of the outer contour of the wedging element, the supporting leg can have a curved, bent or kinked profile, for example. In the case of a wedging element designed as a wedging roller, a profile of the supporting leg in the form of a circular arc matched to the circular outer contour of the wedging roller is preferred.

In another advantageous embodiment of the freewheel according to the invention, the profile of the supporting leg is matched to the outer contour of the wedging element in such a way that, when viewed in the axial direction, the outer contour of the wedging element can be supported or is supported on the supporting leg at least in a linear manner or at at least two mutually spaced points in order to ensure reliable support and a relatively uniform introduction of the preloading force of the spring element.

In order to improve the support of the wedging element on the supporting leg and force transmission between the wedging element and the spring element and, in particular, to avoid tilting of the spring element, the supporting leg can be supported or is supported, on the one hand, by means of a connecting section, which can form a corrugation peak or corrugation trough for example, between the supporting leg and an adjacent leg of the spring body and, on the other hand, at at least one further point of support on the adjacent leg of the spring body.

Based on the embodiment described above, the supporting leg and the adjacent leg of the spring body in another advantageous embodiment of the freewheel according to the invention are designed in such a way that the supporting leg is capable of being supported at the further point of support by transferring the wedging element from the wedging position into the release position. In other words, the support for the supporting leg at the further point of support on the adjacent leg of the spring body is accomplished only by transferring the wedging element from the wedging position into the release position. As an alternative, the supporting leg and the adjacent leg of the spring body can be designed in such a way that the supporting leg is continuously supported at the further point of support. Thus, the supporting leg and the adjacent leg of the spring body can be fastened to one another at the further point of support for example, welding or soldering being suitable fastening methods for example. However, continuous support can also be effected by preloading the spring element in the wedging position of the wedging element in such a way that the supporting leg is already supported at the further point of support on the adjacent leg of the spring body in the wedging position of the wedging element.

In order to achieve the intended support or capacity for support at the further point of support on the adjacent leg of the spring body, the supporting leg has a section which projects in the direction of the adjacent leg, by means of which the supporting leg can be supported or is supported at the further point of support. The section which projects in the direction of the adjacent leg can be implemented merely by the supporting leg having the above-described profile matched to the outer contour of the wedging element, which is bent, curved or kinked if appropriate. As an alternative, the section of the supporting leg which projects in the direction of the adjacent leg can be formed by a free end section of the supporting leg, which allows the intended support irrespective of the supporting leg profile matched to the outer contour of the wedging element. It is also possible for the free end section to be supported at the further point of support by transferring the wedging element into the release position or for it to be continuously supported at the further point of support, as has already been explained above.

In order, on the one hand, to achieve accurate positioning of the spring element within the wedging gap and, on the other hand, to ensure a largely undisturbed action of the spring element, at least one shoulder projecting in an axial direction, by means of which the spring body can be supported or is supported in this axial direction, is provided on the spring body in a particularly preferred embodiment of the freewheel according to the invention. Support by means of the shoulder projecting in the axial direction can be provided, for example, on a side wall delimiting the wedging gap in this axial direction. The shoulder projecting in the axial direction has the advantage that the spring body is not supported or not capable of being supported over its entire side facing in the axial direction on the side wall or the like, with the result that the operation of the spring body or the spring element, i.e. the imposition and relief of the load, is largely unaffected, while the support or capacity for support in the axial direction by means of the projecting shoulder nevertheless allows accurate positioning of the spring body or of the spring element in the axial direction within the wedging gap.

In principle, the shoulder projecting in the axial direction for the purpose of support in or allowing support in this axial direction could be produced in any way, e.g. by attaching a distance piece to the spring body. In another preferred embodiment of the freewheel according to the invention, however, the at least one projecting shoulder is formed by a section of the spring body which is widened in relation to the axial direction. If the spring body is formed by a sheet-metal part or sheet-metal strip for example, the sheet-metal part or sheet-metal strip would have a section which was wider than another section in order to obtain the shoulder projecting in the axial direction. If the spring body is formed by a wire which has a circular cross section, the projecting shoulder could be produced by upsetting the cross section in the radial direction and thus by widening the cross section in the axial direction. In both cases mentioned, the projecting shoulder would consequently be formed in one piece with the spring body or formed by a section of the spring body.

In another advantageous embodiment of the freewheel according to the invention, the at least one projecting shoulder is arranged in the region of the corrugation peaks and/or corrugation troughs in order to provide support or a capacity for support for the spring body or the spring element in the axial direction in a manner which is particularly tilt-proof.

According to another advantageous embodiment of the freewheel according to the invention, both shoulders projecting in one axial direction and shoulders projecting in the opposite axial direction are provided on the spring body.

In another preferred embodiment of the freewheel according to the invention, at least three shoulders projecting in one axial direction are provided in order to provide tilt-proof support. It is preferred here if the at least three shoulders projecting in one axial direction are arranged at the corners of an imaginary triangle in order to achieve the abovementioned security against tilting and reliable support for the spring body or the spring element. In this embodiment too, it is preferred if three shoulders projecting in one axial direction and three shoulders projecting in the opposite axial direction are provided on the spring body.

In order to provide relatively small contact areas with a side wall or the like delimiting the wedging gap by means of the shoulders projecting in the axial direction, the shoulders projecting in the axial direction in another advantageous embodiment of the freewheel according to the invention are of rounded, pointed and/or tapered design at the end thereof pointing in this axial direction.

In order to ensure accurate positioning of the spring body within the wedging gap between the inner ring and the outer ring, the spring body in another preferred embodiment of the freewheel according to the invention can be supported or is supported resiliently in the axial direction, wherein this resilient support or capacity for resilient support in the axial direction can be provided on a side wall or the like delimiting the wedging gap in the axial direction, for example. Thus, for example, the abovementioned projecting shoulders can be designed to be resilient in the axial direction.

In a particularly advantageous embodiment of the freewheel according to the invention, at least one elastic supporting tongue is provided on the spring body, by means of which tongue the spring body can be supported or is supported resiliently in the axial direction. The supporting tongue can be arranged in the region of a corrugation peak or corrugation trough, for example. However, it has proven advantageous if said supporting tongue is provided on one of the legs of the spring body which extends between a corrugation trough and a corrugation peak. In this embodiment, it is furthermore preferred if the spring body can be supported or is supported resiliently in the axial direction over an extended area by the supporting tongue.

In another advantageous embodiment of the freewheel according to the invention, the supporting tongue is formed in one piece with the spring body.

In another advantageous embodiment of the freewheel according to the invention, the spring body is arranged on the freewheel with a preload on the supporting tongue, with the result that the spring body is preloaded into its axial position within the wedging gap.

In another preferred embodiment of the freewheel according to the invention, the spring body can be supported or is supported resiliently both in one axial direction and in the other axial direction. For this purpose, it is preferred if at least two supporting tongues are provided, of which one supporting tongue resiliently supports the spring body in one axial direction while the other supporting tongue resiliently supports the spring body in the other, opposite axial direction.

In another preferred embodiment of the freewheel according to the invention, the spring body is provided at least partially with a wear-inhibiting coating. It is preferred here if the corrugation peak, that is to say at least one of the corrugation peaks, the corrugation trough, that is to say at least one of the corrugation troughs, the supporting leg, the projecting shoulder and/or the supporting tongue have/has a coating, especially since said components may be subject to increased frictional wear, which can be counteracted in this way. The coating is preferably designed as a carbon layer, if appropriate as an amorphous carbon layer, that is to say as a "DLC coating" in order to reduce wear to a large extent.

In another advantageous embodiment of the freewheel according to the invention, the spring body has a fastening section for the direct or indirect fastening of the spring body on the inner or outer ring. Thus, the spring body could, for example, be fastened directly on the inner or outer ring by means of the fastening section or could be fastened indirectly thereon by means of a side wall connected for conjoint rotation to the inner or outer ring and intended to delimit the wedging gap in the axial direction.

In another preferred embodiment of the freewheel according to the invention, the fastening section is fastened by a latching action on the inner or outer ring in order, on the one hand, to achieve reliable fastening of the spring body and, on the other hand, to provide simple mounting of the spring body on the inner or outer ring by means of the fastening section. In this embodiment too, fastening on the inner or outer ring can be accomplished directly or indirectly. In this embodiment, it is furthermore preferred if the spring body is fastened directly or indirectly on the inner or outer ring in a captive manner by means of the fastening section in order to further simplify the mounting of the spring bodies. In this context, captive fastening means that the spring body is fastened directly or indirectly on the inner or outer ring in a captive manner even before the wedging elements and/or the other ring of the inner or outer ring has/have been fitted.

In order to ensure reliable fastening of the spring body on the inner or outer ring by means of the fastening section of the spring body, the fastening section in another preferred embodiment of the freewheel according to the invention has a greater width in relation to the axial direction than another section, if appropriate than at least one of the legs, of the spring body.

In another advantageous embodiment of the freewheel according to the invention, the fastening section of the spring body is fastened on a fastening projection, behind which the fastening section engages, if appropriate with a wedging or latching action, on both sides in relation to the mutually opposite circumferential directions. The fastening projection can, for example, be provided on the outer ring and project inward into the wedging gap in a radial direction. As an alternative, the fastening projection can also be provided on the inner ring and project outward into the wedging gap in a radial direction, although the abovementioned variant embodiment having a fastening projection on the outer ring is preferred.

In another advantageous embodiment of the freewheel according to the invention, the fastening section engages behind the fastening projection from the inside and/or from the outside in relation to the radial direction. If the fastening section engages behind the fastening projection in a radial direction both from the inside and from the outside, particularly reliable retention and, if appropriate, captive arrangement and fastening of the spring body on the fastening projection by means of the fastening section is possible.

In another advantageous embodiment of the freewheel according to the invention, a side wall secured for conjoint rotation on the inner ring or outer ring is provided, serving to delimit a wedging gap between the inner ring and the outer ring in the axial direction. Since this is a side wall secured for conjoint rotation on the inner ring or outer ring, this is not formed integrally or in one piece with the inner ring or outer ring, which simplifies the production of the freewheel.

In another particularly preferred embodiment of the freewheel according to the invention, the fastening projection on which the fastening section of the spring body is fastened is provided on the side wall for delimiting the wedging gap between the inner ring and the outer ring in the axial direction. Thus, in this embodiment, it is possible to dispense with a fastening projection on the inner or outer ring, while a corresponding fastening projection on the side wall is simpler to produce, thus simplifying the production of the freewheel. Moreover, a fastening projection provided on the side wall makes it possible to provide a fastening projection which is spaced apart from the inward-facing side of the outer ring and the outward-facing side of the inner ring and behind which the fastening section of the spring body can thus engage in a relatively simple manner in respect of the mutually opposite circumferential directions and the mutually opposite radial directions.

In another preferred embodiment of the freewheel according to the invention, the fastening projection provided on the side wall is formed by a side wall section projecting into the wedging gap between the inner ring and the outer ring. In other words, the fastening projection is formed integrally or in one piece with the side wall. An integral fastening projection of this kind can be produced in a relatively simple manner, especially if the side wall is of thin-walled design and/or is formed by a sheet-metal part. Thus, it has proven advantageous if the integral fastening projection is formed by a bent, punched-out and/or tongue-shaped section of the side wall in order to reduce the outlay on manufacture and nevertheless to ensure reliable fastening of the spring body on the fastening projection by means of its fastening section.

In order to dispense with a fastening projection, in particular on the outer ring, on the inner ring or on the side wall, and thus to reduce the overall weight of the freewheel, the fastening section of the spring body in another particularly advantageous embodiment of the freewheel according to the invention is introduced into a fastening depression, directly or indirectly fastening the spring body to the inner or outer ring. Even if the term fastening depression is consistently used herein, the term can also include fastening apertures or fastening openings. In each case, it is advantageous with this embodiment if the fastening section is introduced into the fastening depression with a latching action and/or in a captive manner, as already explained above. In this embodiment, the fastening depression is preferably provided in the inner side of the outer ring, the side facing toward the inner ring, or in the outer side of the inner ring, the side facing toward the outer ring. As an alternative, the fastening depression could also be provided in the abovementioned side wall for delimiting the wedging gap between the inner ring and the outer ring in the axial direction, in which case the fastening section could protrude in one of the axial directions into the fastening depression in the side wall, for example.

In order to fasten the spring body reliably on the respective component of the freewheel by means of the fastening section, the fastening depression in another advantageous embodiment of the freewheel according to the invention has an opening edge, behind which the fastening section of the spring body can engage or does engage. In this embodiment, the fastening section of the spring body is preferably in the form of a clip in order to allow the latching fastening already mentioned above of the fastening section of the spring body within the fastening depression.

In another preferred embodiment of the freewheel according to the invention, the wedging element is designed as a wedging roller. In this context, the term wedging rollers should be taken to mean wedging elements with a circular periphery or a circular outer contour.

Since the advantages, mentioned at the outset, of the spring element having an elongate spring body which extends in a radial plane and has a corrugated profile in the radial direction are significant particularly in the case of freewheels which have a wedging gap that is narrow in the axial direction and high in the radial direction and has correspondingly dimensioned wedging elements, the ratio of a width to an outside diameter of the wedging roller in another preferred embodiment of the freewheel according to the invention is equal to or less than 1:3, preferably equal to or less than 1:4, particularly preferably equal to or less than 1:5.

In another advantageous embodiment of the freewheel according to the invention, the outer side of the inner ring, the side facing toward the wedging element, the wedging roller if appropriate, is of substantially circular design, while the inner side of the outer ring, the side facing toward the wedging element, the wedging roller if appropriate, has a shape which differs from a circle. A wedging gap which tapers in phases in the circumferential direction is thereby achieved, with the result that the wedging element prevents rotation of the outer ring relative to the inner ring in the first circumferential direction, when the wedging element or the wedging roller is in the wedging position, while the outer ring can rotate relative to the inner ring in the second circumferential direction in the release position of the wedging element or the wedging roller.

The freewheel arrangement according to the invention for a motor vehicle has a freewheel of the type according to the invention. Moreover, the freewheel arrangement has a starter ring, which is connected for conjoint rotation to the inner ring, a drive output side, that is to say, for example, a drive output side of an internal combustion engine, which is connected for conjoint rotation to the outer ring, and a starter, which is in continuous rotary driving engagement with the starter ring.

In a preferred embodiment of the freewheel arrangement according to the invention, the inner ring is supported directly or indirectly in the radial direction on the drive output side or on a fixed housing in a manner which allows rotation, if appropriate via a rolling contact or sliding contact bearing, with the result that the starter is decoupled from the rotary motion of the drive output side after starting by means of the starter, even if the starter is in continuous rotary driving engagement with the starter ring.

In a particularly preferred embodiment of the invention, the freewheel arrangement according to the invention, the freewheel is designed as a dry freewheel or as a wet freewheel. In the case of embodiment as a dry freewheel, no lubricant is thus provided between the inner ring and the outer ring, on the one hand, and the wedging elements, on the other.

BRIEF DESCRIPTION OF THE DRAWINGS

The invention is explained in greater detail below by means of illustrative embodiments with reference to the attached drawings, in which.

DETAILED DESCRIPTION OF ILLUSTRATIVE VARIATIONS

Figure 1:
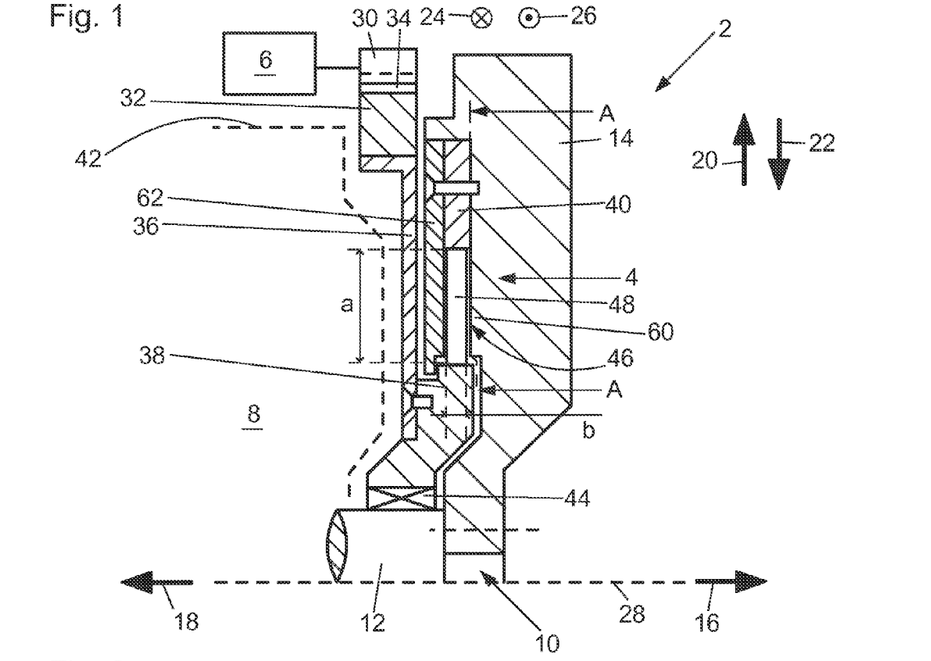
FIG. 1 shows a partial side view of a freewheel arrangement having a freewheel in section.

FIG. 1 shows a freewheel arrangement 2 within a motor vehicle. The freewheel arrangement 2 essentially has a freewheel 4, a starter 6, which is indicated only schematically in FIG. 1, and a drive unit 8, the drive output side 10 of which has a drive shaft 12 and a flywheel 14 connected for conjoint rotation to the drive shaft 12. In the figures, the mutually opposite axial directions 16, 18, the mutually opposite radial directions 20, 22 and the mutually opposite circumferential directions 24, 26 of the freewheel arrangement 2 or of the freewheel 4 are indicated by corresponding arrows, wherein the circumferential direction 24 is referred to below as the first circumferential direction 24 and circumferential direction 26 is referred to below as the second circumferential direction 26. The axis of rotation 28 of the drive output side 10 and of the freewheel 4 extends in the axial directions 16, 18. The first and the second circumferential direction 24, 26 can also be referred to as the first and the second direction of rotation.

An output side 30 of the starter 6, which can be in the form of a pinion for example, is arranged to the outside of the freewheel 4 in the radial direction 20, and it is therefore possible to speak of an output side 30 of the starter 6 which is situated radially on the outside in relation to the freewheel 4. The output side 30 of the starter 6 is in continuous rotary driving engagement with a starter ring 32, wherein the starter ring 32 has for this purpose a rotary driving contour 34, which is in continuous rotary driving engagement with the output side 30 of the starter 6. The starter ring 32 itself is connected for conjoint rotation to an inner ring 38 of the freewheel 4 via a starter wheel 36, which extends inward in the radial direction 22, starting from the starter ring 32. In contrast, an outer ring 40 of the freewheel 4, which surrounds the inner ring 38 of the freewheel 4 on the outside in radial direction 20, is connected for conjoint rotation to the drive output side 10, wherein the outer ring 40 in the embodiment illustrated is connected for conjoint rotation to the side of the flywheel 14 which faces in the axial direction 18. The inner ring 38 is supported directly or indirectly in the radial direction 22, 20 on the drive output side 10, here the drive shaft 12 of the drive output side 10, in such a way as to be rotatable in the circumferential direction 24, 26. As an alternative, the inner ring 38 can also be supported directly or indirectly in the radial direction 20, 22 on a fixed housing, e.g. the housing 42, indicated in FIG. 1, of the drive unit 8, in such a way as to be rotatable. In order to effect the rotatable support, this is preferably accomplished by means of a radial bearing, particularly preferably a rolling contact or sliding contact bearing 44, as indicated in FIG. 1. In the embodiment illustrated, the freewheel 4 is designed as a dry freewheel. As an alternative, however, the freewheel 4 can be designed as a wet freewheel, which is in this case preferably supplied with coolant and/or lubricant by means of the coolant and/or lubricant supply of the drive unit 8.

As already indicated above, the inner ring 38 and the outer ring 40 are in a nested arrangement in the radial direction 20, 22, with the result that a wedging gap 46 extending in the circumferential direction 24, 26 is formed between them. Arranged within the wedging gap 46 is a plurality of wedging elements 48 spaced apart uniformly in the circumferential direction 24, 26, wherein the wedging elements 48 in the embodiment illustrated are designed as wedging rollers, which therefore have a circular periphery or a circular outer contour 50. In principle, however, it is also possible to use other wedging elements 48 here, that is to say, for example, wedging bodies or locking blades with an outer contour that differs from a circle. The outer ring 40 has a running surface 52 facing toward the wedging elements 48 in radial direction 22 on its inner side 54. The encircling inner side 54 has a shape which differs from a circle, as can be seen from FIG. 2. In contrast, the inner ring 38 has on the outer side 58 a running surface 56 which faces in radial direction 20 and faces toward the wedging elements 48. The encircling outer side 58 of the inner ring 38 is of circular design. Consequently, a wedging gap 46 which tapers in the circumferential direction 26 in the region of the respective wedging element 48 is formed between the inner and outer rings 38, 40.

In relation to the axial directions 16, 18, the wedging elements 48 designed as wedging rollers have a width b and an outside diameter a. The ratio of the width b to the outside diameter a of the respective wedging element 48 designed as a wedging roller is equal to or less than 1:3, preferably equal to or less than 1:4, particularly preferably equal to or less than 1:5. In other words, it is also possible to refer to coin-shaped wedging elements 48.

The wedging gap 46 is delimited in axial direction 16 by a first side wall 60 and in axial direction 18 by a second side wall 62, wherein the first side wall 60 is formed by a section of the flywheel 14, while the second side wall 62 is formed separately from the flywheel 14 as an annular disk. Both the first side wall 60 or the flywheel 14 forming the first side wall 60 and the second side wall 62 are fastened for conjoint rotation on the outer ring 40 of the freewheel 4, it being possible to achieve this by means of the screwed joint illustrated in FIG. 1, for example. Although it would be possible in principle, the second side wall 62 is not formed in one piece or integrally with the outer ring 40, and this significantly simplifies the production of the freewheel 4.

Figure 2:
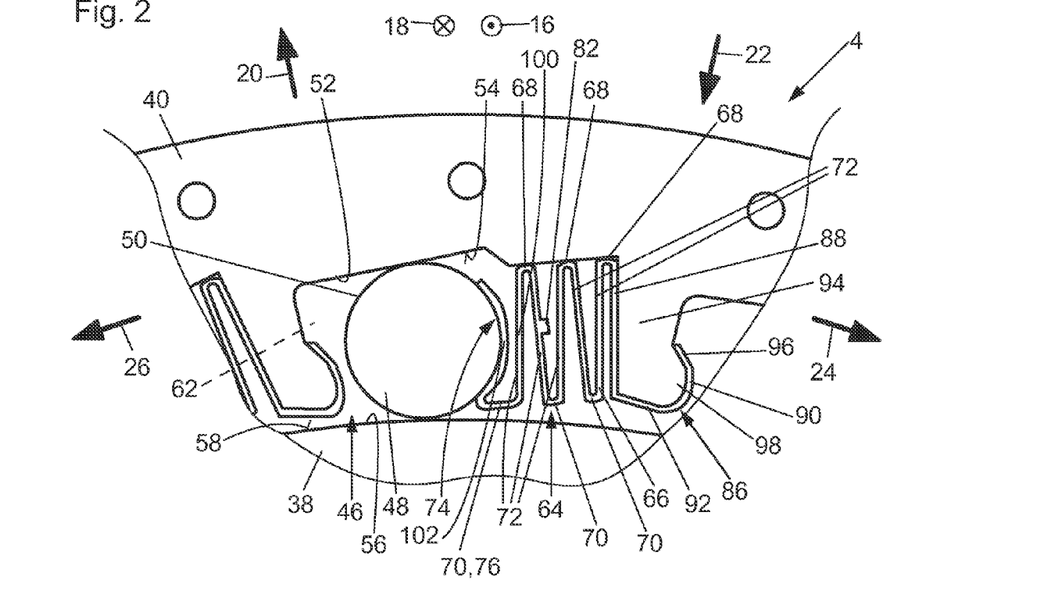
FIG. 2 shows a view along section line A-A in FIG. 1 with the freewheel in a first embodiment.

The wedging elements 48 can each be moved from a wedging position, which is indicated by way of example in FIG. 2 and in which the wedging element 48 prevents rotation of the outer ring 40 relative to the inner ring 38 in the first circumferential direction 24, into a release position, in which the outer ring 40 can be rotated relative to the inner ring 38 in the opposite, second circumferential direction 26. Thus, the basic construction of the freewheel 4 is that of a "one-way clutch". Here, the respective wedging element 48 is preloaded into the tapering wedging gap 46 in the circumferential direction 26 by means of a spring element 64, into the wedging position shown in FIG. 2.

The spring element 64 has an elongate spring body 66. As can be seen especially from FIG. 3, the elongate spring body 66 is designed here as an elongate sheet-metal strip. As an alternative to the sheet-metal part or sheet-metal strip, however, it is also possible to use a wire as a spring body 66. In contrast to a helical spring, the spring body of which, usually a wire, is wound in a helical shape, the elongate spring body 66 of the spring element 64 extends in a radial plane defined by the radial directions 20, 22, wherein the spring body 66 has a corrugated profile in the radial direction 20, 22. The width direction of the sheet-metal strip used as the spring body 66 in the present embodiment corresponds here substantially to the axial directions 16, 18.

By virtue of its profile corrugated in the radial direction 20, 22, the spring body 66 has corrugation peaks 68 situated radially on the outside and corrugation troughs 70 situated radially on the inside, between which legs 72 of the elongate spring body 66 extend, preferably in a rectilinear fashion. Consequently, the legs 72 are arranged substantially in alignment with one another in the circumferential direction 24, 26. As can be seen from FIGS. 2 and 3, at least two, if appropriate at least three, corrugation peaks 68 and at least two, if appropriate at least three, corrugation troughs 70 are preferably provided. The corrugation peaks 68 situated radially on the outside can be supported or are supported toward the outside in radial direction 20 on the inner side 54 of the outer ring 40, while the corrugation troughs 70 situated radially on the inside are spaced apart in the radial direction 20, 22 from the outer side 58 of the inner ring 38.

The spring body 66 furthermore has a supporting leg 74 that faces toward the respective wedging element 48. The supporting leg 74 is connected to the last leg 72 by a connecting section 76 of the spring body 66, wherein the connecting section 76 here likewise forms a corrugation trough 70. The supporting leg 74 is arranged relative to the respective wedging element 48 in such a way that the wedging element 48 can be supported or is supported on the supporting leg 74. As can be seen especially from FIG. 3, the supporting leg 74 has a greater width than another section of the spring body 66 in relation to the axial directions 16, 18, in this case a greater width than the legs 72 of the spring body 66 which extend between the corrugation peaks 68 and corrugation troughs 70. The supporting leg 74 also has a profile matched to the outer contour 50 of the wedging element 48. In the embodiment illustrated, the supporting leg 74 has a curved or bent profile, wherein the outer contour 50 of the wedging element 48 can be supported or is supported in a linear manner on the supporting leg 74 when viewed in the axial direction 16 or 18. In the illustrated embodiment according to FIGS. 2 to 4, the supporting leg 74 thus has a profile in the form of a circular arc so that it can be supported or is supported in a linear manner on the wedging element 48 by means of the circular outer contour 50 thereof.

A plurality of shoulders 78 projecting in axial direction 18 and a plurality of shoulders 80 projecting in axial direction 18 are furthermore provided on the spring body 66. Here, the projecting shoulders 78, 80 are each formed by a section of the spring body 66, here of the sheet-metal strip, which is widened in relation to the axial directions 16, 18, and are thus formed in one piece with the spring body 66. In this case, the projecting shoulders 78, 80 are arranged in the region of the corrugation peaks 68 and of the corrugation troughs 70 respectively. The spring body 66 can be supported or is supported in axial direction 16 on the first side wall 60 by way of the shoulders 78 projecting in axial direction 16, while the spring body 66 can be supported or is supported in the opposite axial direction 18 on the second side wall 62 by way of the projecting shoulders 80. As can be seen from the preceding description, at least three shoulders 78 projecting in axial direction 16 are provided, while at least three shoulders 80 projecting in the opposite axial direction 18 are provided, wherein the at least three projecting shoulders 78 are arranged at the corners of an imaginary triangle, and the at least three projecting shoulders 80 are arranged at the corners of another imaginary triangle. In this way, reliable support and/or positioning of the spring body 66 in the axial directions 16, 18 is ensured by means of the projecting shoulders 78, 80. At the end thereof facing in the respective axial direction 16 or 18, the projecting shoulders 78, 80 are of rounded, pointed or tapered design in order to reduce the contact area with the respective side wall 60 or 62.

The spring body 66 can furthermore be supported or is supported on the first side wall 60 in axial direction 16 and resiliently on the second side wall 62 in axial direction 18. This can be achieved, for example, by means of projecting shoulders 78, 80 designed to be elastic or resilient in the axial direction 16, 18. In the illustrated embodiment according to FIGS. 2 to 4, two elastic supporting tongues 82, 84 are provided on the spring body 66 to provide resilient support or the capacity for resilient support, wherein the spring body 66 can be supported or is supported resiliently on the first side wall 60 in axial direction 16 by means of supporting tongue 82 and can be supported or is supported resiliently on the second side wall 62 in axial direction 18 by means of supporting tongue 84. In the illustrated embodiment, the supporting tongues 82, 84 are each arranged on one of the legs 72 of the spring body 66, wherein both supporting tongues 82, 84 are formed in one piece with the spring body 66, here with the sheet-metal part designed as a sheet-metal strip. The supporting tongues 82, 84 are each supporting tongues 82, 84 which project in axial direction 16 and 18 respectively and are furthermore bent out of the plane of the sheet-metal strip in order to achieve their resilient action. In this case, the spring body 66 is introduced into the wedging gap 46 in such a way that both supporting tongues 82, 84 are supported under preload thereon on the respective side wall 60, 62.

The spring body 66 furthermore has a substantially U-shaped fastening section 86, which is formed on the opposite side of the spring body 66 from the supporting leg 74. The fastening section 86 serves for the direct or indirect fastening of the spring body 66 on the outer ring 40 of the freewheel 4. The fastening section 86 has two fastening legs 88, 90 situated opposite one another in the circumferential direction 24, 26 and a connecting leg 92, which connects the fastening legs 88, 90 on the inside in radial direction 22. The fastening section 86 is fastened on a fastening projection 94 with a latching action and in a captive manner. The fastening projection 94 is arranged on the outer ring 40 and, here, is formed in one piece with the outer ring 40, wherein the fastening projection 94 extends inward into the wedging gap 46 in radial direction 22, starting from the inner side 54 of the outer ring 40. In the fastened state of the spring body 66, fastening leg 88 engages behind the fastening projection 94 in circumferential direction 26 and fastening leg 90 engages behind it in circumferential direction 24, and therefore fastening section 86 engages behind it on both sides in relation to the mutually opposite circumferential directions 24, 26. Moreover, the connecting leg 92 of the fastening section 86 engages behind the fastening projection 94 in relation to radial direction 22, and a free end section 96 of fastening leg 90 engages behind it in relation to radial direction 20, wherein, for this purpose, the fastening projection 94 has a nose 98 which projects in circumferential direction 24 and behind which said free end section 96 of fastening leg 90 engages. In other words, the fastening section 86 engages behind the fastening projection 94 from the inside and the outside in relation to the radial directions 22, 20.

Figure 3:
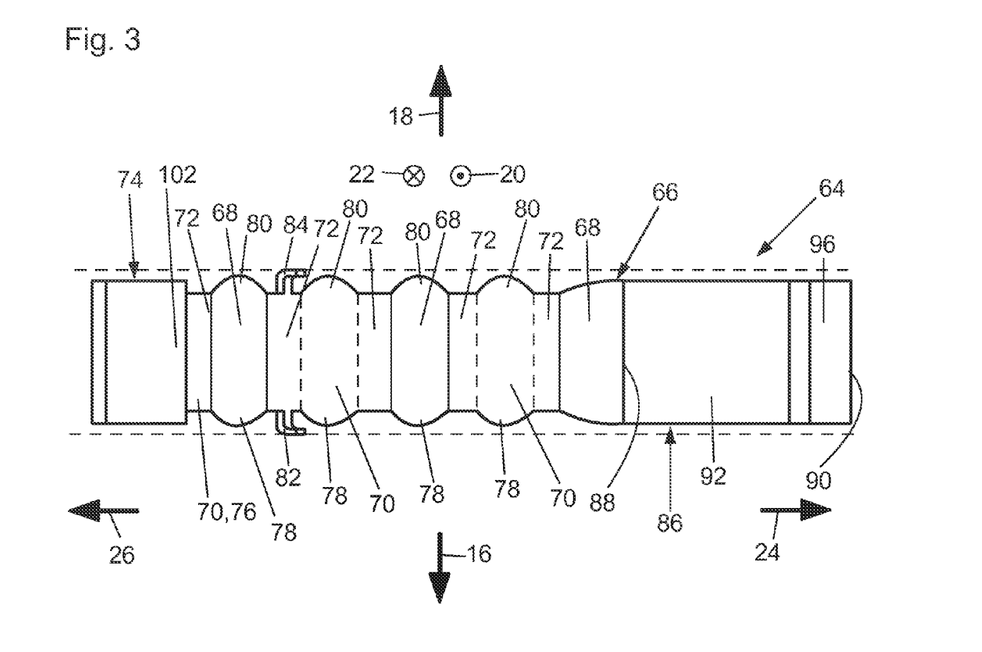
FIG. 3 shows a plan view of the spring body from FIG. 2 in isolation.
Figure 4:
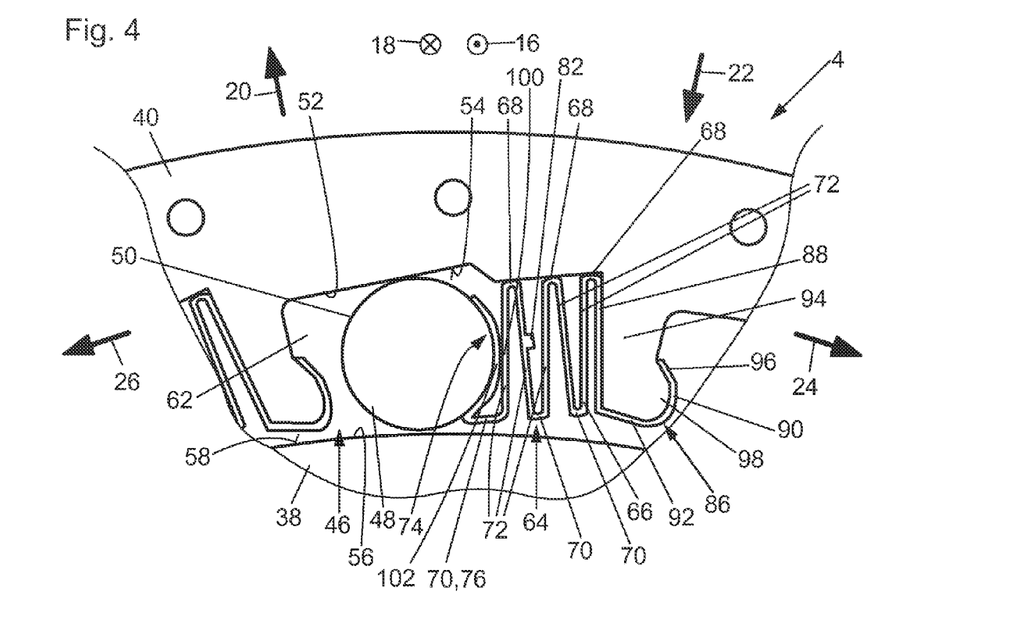
FIG. 4 shows the freewheel from FIG. 2 with the wedging element in the release position.

Both in the first embodiment according to FIGS. 2 to 4 and in the subsequently described embodiments of the freewheel 4, the fastening section 86 is fastened with a latching action on the outer ring 40, thereby simplifying the mounting and captive arrangement of the spring body 66 on the outer ring 40. Like the supporting leg 74, the fastening section 86 of the spring body 66, in this case of the sheet-metal part or sheet-metal strip, also has a greater width in relation to the axial directions 16, 18 than another section of the spring body 66, in this case a greater width than the legs 72 between the corrugation peaks 68 and the corrugation troughs 70, in order to bring about particularly reliable, in particular tilt-proof, fastening of the spring body 66 on the outer ring 40.

As already indicated above, the supporting leg 74 is connected to the adjacent leg 72 by the connecting section 76 between the supporting leg 74 and the adjacent leg 72 of the spring body 66 and is thus supported via the connecting section 76 on the adjacent leg 72. Moreover, the supporting leg 74 can be supported or is supported at at least one further point of support 100 on the adjacent leg 72 of the spring body 66, as is indicated in FIG. 4. In the embodiment illustrated, the supporting leg 74 can be supported at the further point of support 100 by transferring the wedging element 48 from the wedging position shown in FIG. 2 into the release position shown in FIG. 4. As an alternative, the supporting leg 74 can already be supported at the further point of support 100 and thus supported continuously in its wedging position shown in FIG. 4, wherein this can be accomplished either by appropriate preloading of the spring element 64 in the wedging position and/or by fastening the supporting leg 74 on the adjacent leg 72 in the region of the point of support 100.

Irrespective of the respectively selected variant embodiment, the further point of support 100 offers the advantage that the wedging element 48 can be supported in a particularly reliable manner on the supporting leg 74 of the spring body 66. In order to effect the selective support of the supporting leg 74 at the point of support 100, the supporting leg 74 has a section 102 which projects in the direction of the adjacent leg 72 and by means of which section the supporting leg 74 can be supported or is supported at the further point of support 100. In the illustrated embodiment according to FIGS. 2 to 4, the projecting section 102 is already provided by the curved or bent profile of the supporting leg 74 matched to the outer contour 50 of the wedging element 48.

Figure 5:
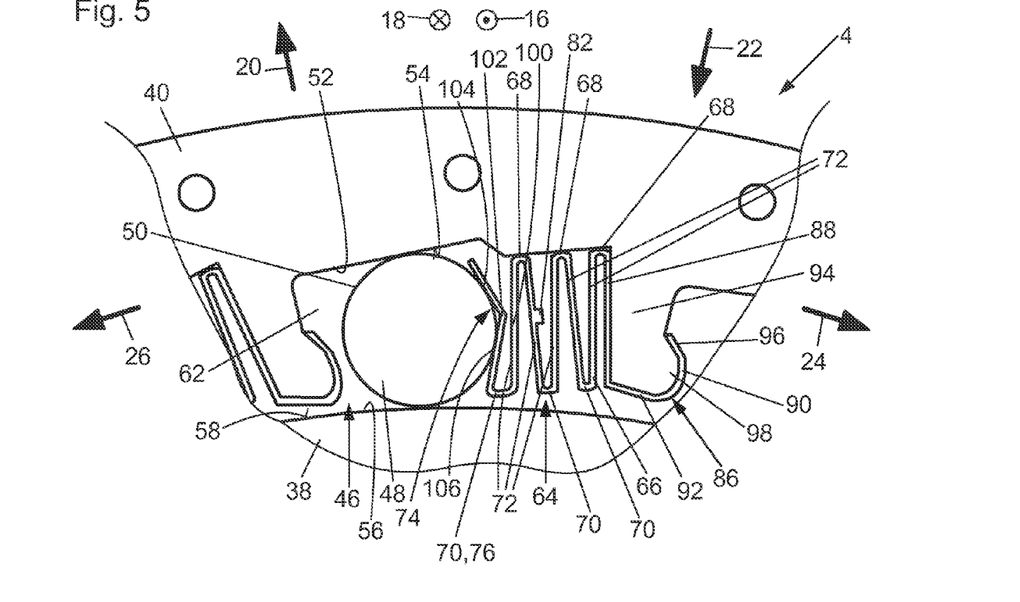
FIG. 5 shows a view along section line A-A in FIG. 1 with the freewheel in a second embodiment.
Figure 6:
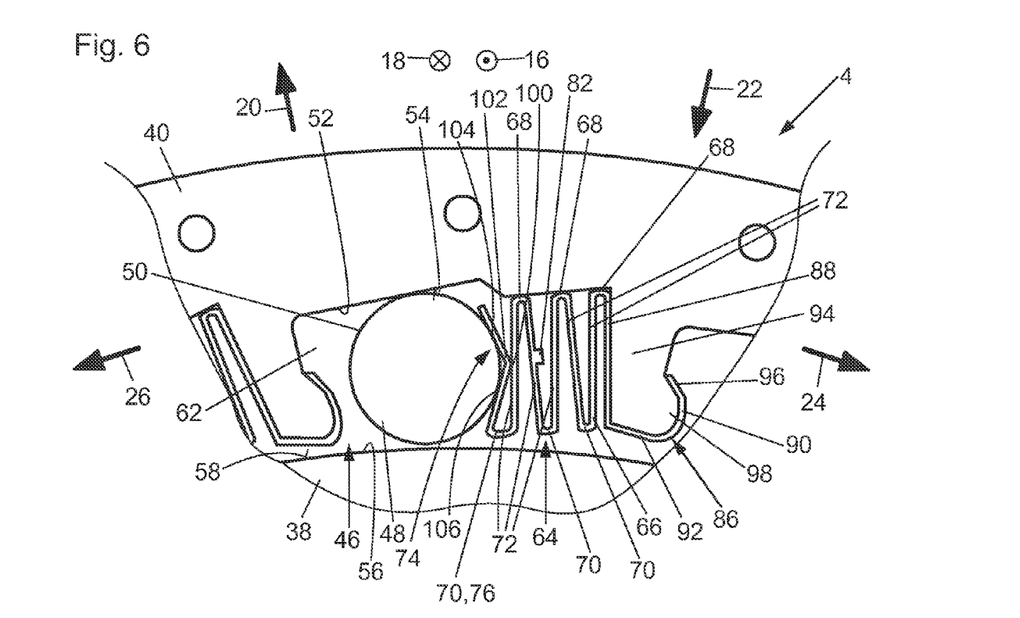
FIG. 6 shows the freewheel from FIG. 5 with the wedging element in the release position.

A second embodiment of the freewheel 4 for use in the freewheel arrangement 2 shown in FIG. 1 is described below with reference to FIGS. 5 and 6, said embodiment corresponding substantially to the first embodiment shown in FIGS. 2 to 4, and therefore only the differences will be explored below, identical or similar parts are provided with the same reference signs and in other respects the preceding description applies accordingly.

In the second embodiment, the supporting leg 74 likewise has a profile matched to the outer contour 50 of the wedging element 48, wherein in this case the supporting leg 74 has a kinked profile. As a result, the outer contour 50 of the wedging element 48 in the form of the wedging roller can be supported or is supported on the supporting leg 74 at two mutually spaced points 104, 106, which in this case are spaced apart from one another in the radial direction 20, 22. In the case of a supporting leg 74 which has a kinked profile, at least two mutually spaced points 104, 106, at which the outer contour 50 of the wedging element 48 designed as a wedging roller can be supported or is supported, should always be provided. In this second embodiment too, the kinked profile has the effect that the supporting leg 74 has the section 102 which projects in the direction of the adjacent leg 72 and can be supported or is supported on the adjacent leg 72 at the further point of support 100 through transfer of the wedging element 48 into the release position shown in FIG. 6. Nonetheless, it is also possible in the case of the second embodiment to support the supporting leg 74 continuously at the further point of support 100, as already explained with reference to the first embodiment shown in FIGS. 2 to 4.

A third embodiment of the freewheel 4 for use in the freewheel arrangement 2 shown in FIG. 1 is described below with reference to FIGS. 7 and 8, said embodiment corresponding substantially to the embodiment shown in FIGS. 2 to 4, and therefore only the differences will be explored below, identical or similar parts are provided with the same reference signs and in other respects the preceding description applies accordingly.

Figure 7:
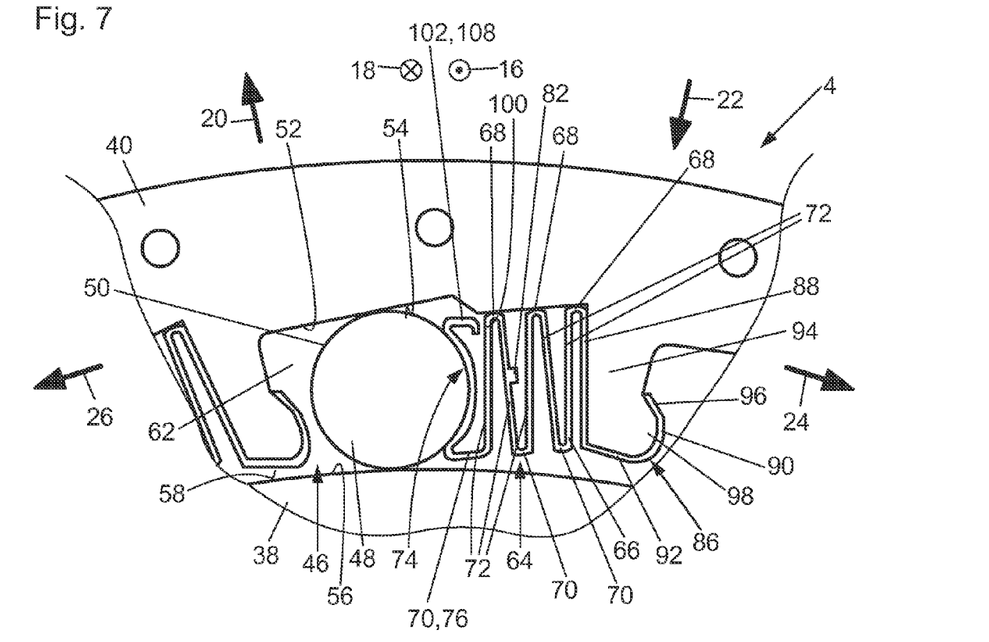
FIG. 7 shows a view along section line A-A in FIG. 1 with the freewheel in a third embodiment.
Figure 8:
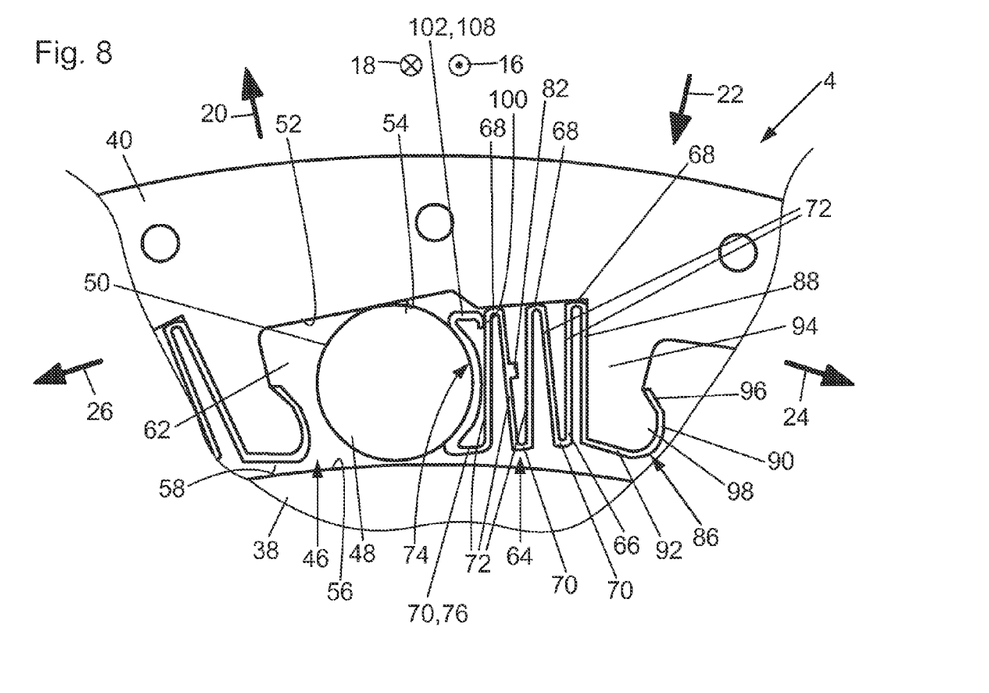
FIG. 8 shows the freewheel from FIG. 7 with the wedging element in the release position.

In the third embodiment, the supporting leg 74 has a free end section 108, which is bent in such a way that it forms a section 102 of the supporting leg 74 which projects in the direction of the adjacent leg 72 and by means of which the supporting leg 74 can be supported or is supported on the adjacent leg 72 at the further point of support 100, as indicated in FIG. 8, in which the wedging element 48 has been transferred into the release position, starting from the wedging position shown in FIG. 7. In this case too, the supporting leg 74 can be supported continuously on the adjacent leg 72 at the further point of support 100 by means of the free end section 108. As is apparent especially from comparison with the illustration in FIG. 4, a point of support 100 on the adjacent leg 72 further out on the adjacent leg 72 in the radial direction 20 is obtained by means of the third embodiment, with the result that particularly uniform support is achieved by means of the point of support 100 and the connecting section 76 and consequently the wedging element 48 is supported in a particularly uniform and reliable manner on the spring body 66 or the supporting leg 74 thereof.

A fourth embodiment of the freewheel 4 for use in the freewheel arrangement 2 shown in FIG. 1 is described below with reference to FIG. 9, said embodiment corresponding substantially to the first embodiment shown in FIGS. 2 to 4, and therefore only the differences will be explored below, identical or similar parts are provided with the same reference signs and in other respects the preceding description applies accordingly.

Figure 9:
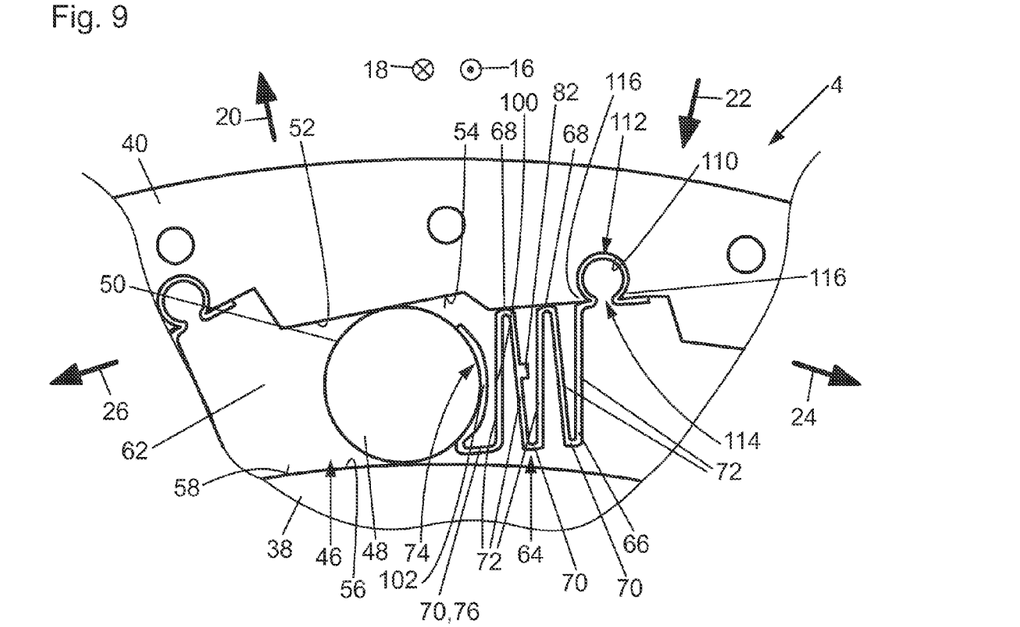
FIG. 9 shows a view along section line A-A in FIG. 1 with the freewheel in a fourth embodiment.

In contrast to the embodiment described above, a fastening projection is dispensed with in the fourth embodiment shown in FIG. 9. Instead of the fastening projection 94, a fastening depression 110 is, on the contrary, provided in the inner side 54 of the outer ring 40, the side facing toward the inner ring 38, and the fastening section 112 of the spring body 66 is introduced into said depression with a latching action and in a captive manner, fastening the spring body 66 on the outer ring 40. The fastening depression 110 has an opening 114, behind the opening edge 116 of which the fastening section 112 of the spring body 66 can engage or does engage. Here, the fastening section 112 is of mushroom-like or omega-shaped design and projects outward in radial direction 20. Thus, the fastening section 112 can be introduced through the opening 114 into the fastening depression 110 in radial direction 20, while the fastening section 112 is compressed elastically, and the fastening section 112 can expand again elastically after reaching the fastening position, which is shown in FIG. 9, in order to engage behind the opening edge 116 and to effect reliable fastening of the spring body 66 on the outer ring 40. In general terms, the fastening section 112 is in the form of a clip which can be introduced into the fastening depression 110 with a latching action. The particular advantage of the fourth embodiment can be regarded as the fact that manufacture of the outer ring 40 and mounting of the spring body 66 on the outer ring 40 is simplified and the weight of the freewheel 4 is reduced by dispensing with the fastening projection 94. In principle, however, it is also possible to provide a fastening projection 94, wherein in this case the fastening depression 110 or the opening 114 thereof could advantageously be provided in the side of the fastening projection 94 which faces toward the wedging element 48. In this variant, particularly reliable support for the spring element 64 on the outer ring 40 is ensured, and mounting of the spring body continues to be particularly simple.

A fifth embodiment of the freewheel 4 for use in the freewheel arrangement 2 shown in FIG. 1 is described below with reference to FIG. 10, said embodiment corresponding substantially to the first embodiment, and therefore only the differences will be explored below, identical or similar parts are provided with the same reference signs and in other respects the preceding description applies accordingly.

In contrast to the embodiments described above, the fastening projection 94 in the fifth embodiment is provided neither on the outer ring 40 nor on the inner ring 38. On the contrary, the fastening projection 94 is provided on the second side wall 62, and the fastening projection 94 projects into the wedging gap 46 in the axial direction 16. This is advantageous in as much as a fastening projection 94 of this kind on the second side wall 62 is easier to produce than a fastening projection 94 provided on the outer or inner ring 40, 38, especially since the second side wall 62, although fastened on the outer ring 40, is not formed integrally or in one piece with the outer ring 40. In order to further simplify manufacture, the fastening projection 94 on the second side wall 62 is formed by a section of the side wall and is thus formed in one piece with the second side wall 62. Since the second side wall 62 can be of relatively thin-walled design, it is furthermore preferred—as indicated in FIG. 10—if the section of the second side wall 62 which forms the fastening projection 94 is formed by a partially punched-out and bent, if appropriate tongue-shaped, section of the second side wall 62. In order to further simplify this manufacturing process, the second side wall 62 is preferably designed as a sheet-metal part.

Figure 10:
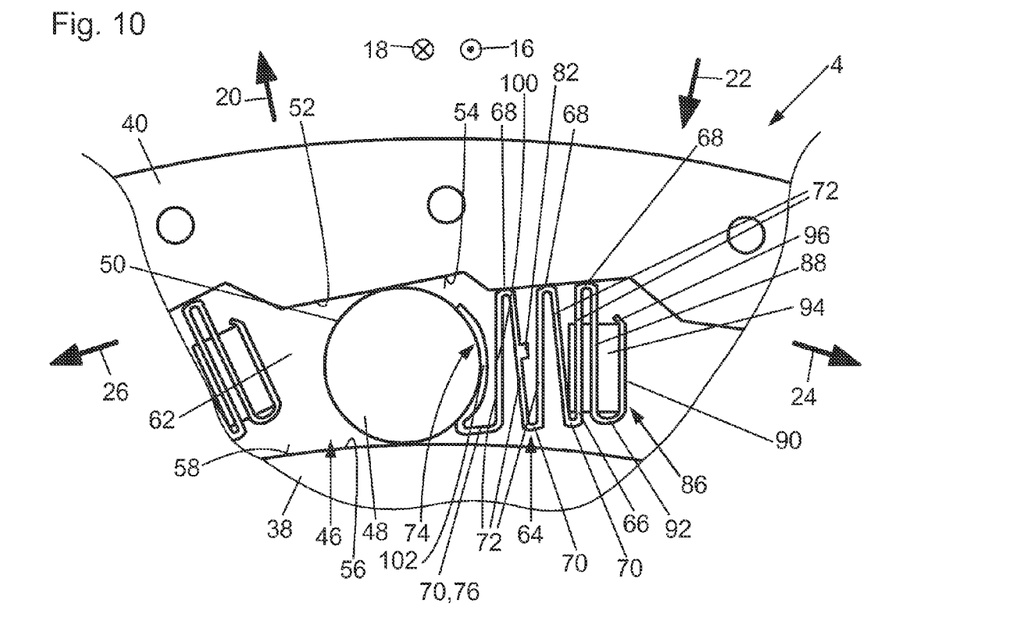
FIG. 10 shows a view along section line A-A in FIG. 1 with the freewheel in a fifth embodiment.

As can furthermore be seen from FIG. 10, the fastening projection 94 provided on the second side wall 62 can be spaced apart both from the inner side 54 of the outer ring 40 and from the outer side 58 of the inner ring 38 in the radial direction 20, 22, simplifying engagement behind the fastening projection 94 on the inside and the outside in relation to the two radial directions 20, 22 without the need for the fastening projection 94 to have the nose 98 described above with reference to the first embodiment. On the contrary, the free end section 96 of the fastening leg 90 of the fastening section 86 can engage behind the side of the fastening projection 94 which faces outward in radial direction 20. In other respects, the fastening section 86 corresponds substantially to the fastening section 86 already described with reference to FIGS. 2 to 4, and therefore reference may be made to the above description in respect of its operation.

During the operation of the above-described embodiments of the freewheels 4, there may be relatively severe local wear, especially frictional wear, on the spring body 66. For this reason, the spring body 66 is provided at least partially with a wear-inhibiting coating. In the case of the spring bodies 66 illustrated, the corrugation peaks 68, the supporting leg 74, the projecting shoulders 78, 80 and the supporting tongues 82, 84, in particular, are subject to relatively severe friction, and therefore said locations on the spring body 66 are preferably provided with a wear-inhibiting coating of this kind. As a supplementary measure, the corrugation troughs 70 and the fastening section 86 could also have a corresponding coating, even though they are not exposed to any major friction—at least in the embodiments described and shown in FIGS. 1 to 10. A carbon layer, which is preferably designed as an amorphous carbon layer, i.e. as a "DLC layer", has proven advantageous as a coating here.

Figure 11:
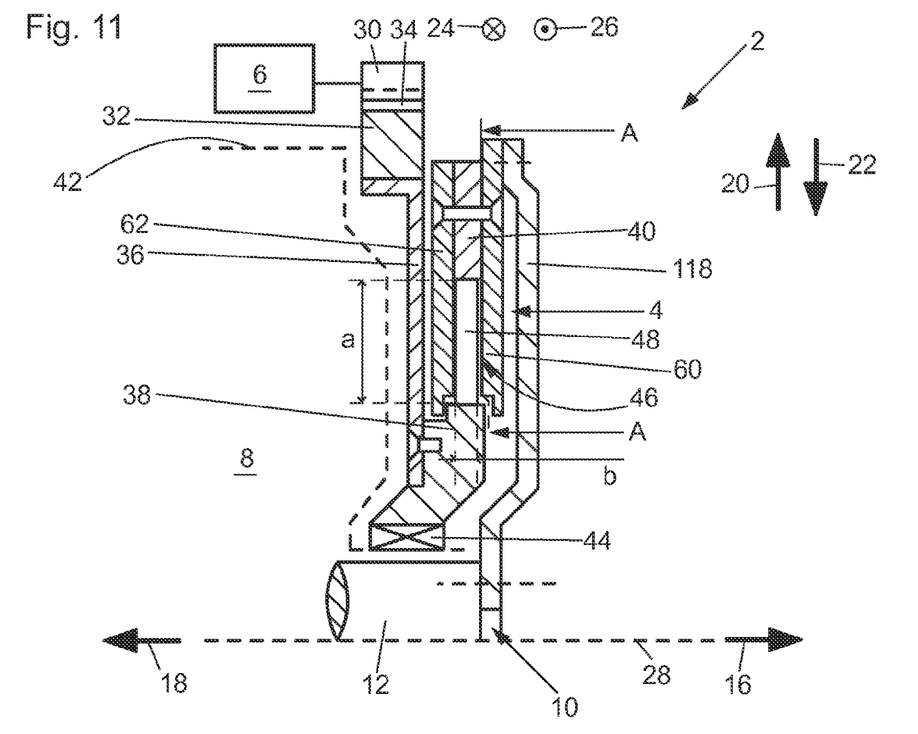
FIG. 11 shows a partial side view of another freewheel arrangement with a freewheel in section.

FIG. 11 shows another freewheel arrangement 2, which corresponds substantially to the first freewheel arrangement 2 shown in FIG. 1, and therefore only the differences will be explored below, identical or similar parts are provided with the same reference signs and in other respects the preceding description applies accordingly. In particular, the freewheels 4 described with reference to FIGS. 2 to 10 can also be employed in the freewheel arrangement shown in FIG. 11.

In contrast to the freewheel arrangement 2 shown in FIG. 1, a flywheel 14 is dispensed with in the freewheel arrangement 2 shown in FIG. 11. Instead, use is made of a flexible plate 118, which is connected for conjoint rotation on the inside in radial direction 22 to the drive output side 10, in this case the drive shaft 12. The first side wall 60 is not formed by a section of the flexible plate 118 but instead—as was previously the second side wall 62—by a separate annular disk. The flexible plate 118 is connected for conjoint rotation on the outside in radial direction 20 to the outer ring 40, in the illustrated embodiment indirectly via the first side wall 60, which, for its part, is fastened on the outer ring 40. Both side walls 60, 62 are preferably designed as sheet-metal parts. In the illustrated embodiment, the fastening projections 94 described with reference to FIG. 10 can thus also be provided on the first side wall 60, for example.

As already indicated above, the inner ring 38 does not necessarily have to be supported on the drive output side 10. Thus, in the embodiment shown in FIG. 11, the inner ring 38 is supported directly or indirectly in a rotatable manner on the fixed housing 42 of the drive unit 8 in the radial direction 20, 22, if appropriate by means of a supporting element fastened on the housing 42. In order to provide the rotatable support, this is preferably once again accomplished by means of a radial bearing, particularly preferably the rolling contact or sliding contact bearing 44.

The freewheel arrangement 2 in the further embodiment shown in FIG. 11 has a particularly compact and lightweight construction, wherein axial displacements of the drive shaft 12 and tilting thereof relative to the axis of rotation 28 can be compensated for by the flexible plate 118, which, for this purpose, is preferably formed by a flexible sheet-metal part.

In the above text, only embodiments of the freewheel 4 in which the spring element 64 or the spring body 66 thereof is fastened on the outer ring 40 directly or indirectly, e.g. by means of the side walls 60, 62, have been described. This has the advantage that the centrifugal forces acting in radial direction 20 on the spring element 64 or the spring body 66 thereof can be supported more reliably and largely without friction. However, it is readily apparent to a person skilled in the art that the spring element 64 or the spring body 66 thereof could likewise be fastened directly or indirectly on the inner ring 38. In these cases, the fastening projection 94 could be provided on the outer side 58 of the inner ring 38, the side facing toward the outer ring 40, or, if appropriate, on a side wall connected for conjoint rotation to the inner ring 38, for example, while the fastening depression 110 could be provided in the outer side 58 of the inner ring 38, for example.

LIST OF REFERENCE SIGNS 2 freewheel arrangement
4 freewheel
6 starter
8 drive unit
10 drive output side
12 drive shaft
14 flywheel
16 axial direction
18 axial direction
20 radial direction
22 radial direction
24 first circumferential direction
26 second circumferential direction
28 axis of rotation
30 output side
32 starter ring
34 rotary driving contour
36 starter wheel
38 inner ring
40 outer ring
42 housing
44 rolling contact or sliding contact bearing
46 wedging gap
48 wedging elements
50 outer contour
52 running surface
54 inner side
56 running surface
58 outer side
60 first side wall
62 second side wall
64 spring element
66 spring body
68 radially outer corrugation peaks
70 radially inner corrugation troughs
72 leg
74 supporting leg
76 connecting section
78 projecting shoulders
80 projecting shoulders
82 supporting tongue
84 supporting tongue
86 fastening section
88 fastening leg
90 fastening leg
92 connecting leg
94 fastening projection
96 free end section
98 nose
100 point of support
102 projecting section
104 point
106 point
108 free end section
110 fastening depression
112 fastening section
114 opening
116 opening edge
118 flexible plate
a outside diameter
b width

The invention claimed is:

1. A freewheel having an inner ring, an outer ring and at least one wedging element between the inner ring and the outer ring, wherein the freewheel is constructed and arranged to be moved between a wedging position wherein the wedging element prevents rotation of the outer ring relative to the inner ring in a first circumferential direction and a release position wherein the outer ring is rotated in an opposite, second circumferential direction relative to the inner ring; and wherein the wedging element is preloaded into the wedging position by means of a spring element, wherein the spring element has an elongated spring body, which extends in a radial plane and has a corrugated profile in a radial direction, and wherein the spring body includes at least one shoulder which projects in an axial direction a distance greater than a remaining portion of the spring body and which supports the spring body in the axial direction.

2. The freewheel set forth in claim 1, wherein the spring body is formed of a sheet-metal part or a wire.

3. The freewheel as set forth in claim 1, wherein the spring body further comprises a first end leg, a plurality of radially extending outer corrugation peaks, a plurality of radially extending inner corrugation troughs, a second end leg at an end opposite of the first end leg, and a plurality of body legs which extend between the first leg, the plurality of radially extending outer corrugation peaks, the plurality of radially extending inner corrugation troughs, and the second end leg.

4. The freewheel set forth in claim 3 wherein the first end leg supports the wedging element.

5. The freewheel set forth in claim 4, wherein the first end leg is supported by means of a connecting section between the first end leg and an adjacent one of the plurality of body legs at at least one further point of support on the adjacent one of the plurality of body legs, and wherein the first end leg is constructed and arranged to be supported at the further point of support by transferring the wedging element into the release position or to be continuously supported at the further point of support and has a section which projects in the direction of the adjacent one of the plurality of body legs by means of which the first end leg is supported at the further point of support.

6. The freewheel set forth in claim 3 wherein the at least one shoulder extends from at least one of the plurality of radially extending outer corrugation peaks or the plurality of radially extending inner corrugation troughs.

7. The freewheel set forth in claim 3 further comprising at least one elastic supporting tongue arranged on at least one of the plurality of body legs and which supports the spring body in the axial direction, and wherein the at least one elastic supporting tongue is one continuous uninterrupted piece with the spring body, and wherein the spring body is arranged on the freewheel with a preload on the at least one elastic supporting tongue.

8. The freewheel set forth in claim 7 wherein the at least one elastic supporting tongue is provided at least partially with a wear-inhibiting coating and wherein the coating is a carbon layer.

9. The freewheel set forth in claim 3 wherein the second end leg is a fastening section which is U-shaped, for fastening of the spring body on the inner or the outer ring, wherein the fastening section is fastened on the inner or the outer ring by a latching action and has a greater width in relation to the axial direction than at least one remaining section.

10. The freewheel set forth in claim 9, wherein the fastening section is fastened on a fastening projection having a first side and a second side, and wherein the fastening section engages both the first side and the second side in relation to mutually opposite circumferential directions, and wherein the fastening section engages the fastening projection from at least one of an inside or an outside of the fastening section in relation to the radial direction.

11. The freewheel set forth in claim 9, wherein at least one of the outer ring or the inner ring comprises a fastening depression, wherein the fastening section is held within the fastening depression; wherein the spring body is operatively attached to at least one of the inner ring or the outer ring; and wherein the fastening section is constructed and arranged to engage the fastening depression.

12. The freewheel set forth in claim 3 wherein at least one of the plurality of radially extending inner corrugation troughs, the plurality of radially extending outer corrugation peaks, the at least one shoulder, or the first end leg are provided at least partially with a wear-inhibiting coating and wherein the coating is a carbon layer.

13. The freewheel set forth in claim 1 wherein the spring body is provided at least partially with a wear-inhibiting coating and wherein the coating is a carbon layer.

14. The freewheel set forth in claim 1 wherein a side wall secured for conjoint rotation on the inner ring or the outer ring is provided for delimiting a wedging gap between the inner ring and the outer ring in the axial direction, wherein a fastening projection is provided on the side wall and is formed by a section of the side wall which projects into the wedging gap, the section being at least one of bent or punched out.

15. The freewheel set forth in claim 1 wherein the wedging element is a wedging roller, wherein the ratio of a width (b) to an outside diameter (a) of the wedging roller is equal to or less than 1:3.

16. The freewheel set forth in claim 1 wherein the at least one shoulder comprises at least three shoulders projecting in the axial direction.

17. A freewheel arrangement for a motor vehicle having the freewheel as set forth in claim 1; a starter ring, wherein the starter ring is connected for conjoint rotation to the inner ring; a drive output side, which is connected for conjoint rotation to the outer ring; and a starter which is in continuous rotary driving engagement with the starter ring, wherein the inner ring is supported in the radial direction on at least one of the drive output side or on a fixed housing and is constructed and arranged to allow for rotation via at least one of a rolling contact bearing or a sliding contact bearing, and the freewheel is one of a dry freewheel or a wet freewheel.

18. A freewheel having an inner ring, an outer ring and at least one wedging element between the inner ring and the outer ring, wherein the freewheel is constructed and arranged to be moved between a wedging position, wherein the wedging element prevents rotation of the outer ring relative to the inner ring in a first circumferential direction, and a release position, wherein the outer ring is rotated in an opposite, second circumferential direction relative to the inner ring; and wherein the wedging element is preloaded into the wedging position by means of a spring element, wherein the spring element has an elongated spring body which extends in a radial plane and has a corrugated profile in a radial direction, and wherein the spring body comprises a plurality of radially extending outer corrugation peaks, a plurality of radially extending corrugation troughs, and a plurality of legs which extend therebetween, and at least one elastic supporting tongue arranged on at least one of the plurality of legs which supports the spring body in the axial direction, and wherein the spring body is arranged on the freewheel with a preload on the at least one elastic supporting tongue.

* * * * *